United States Patent
Palmer (10) Patent No.: US 9,925,507 B2
(45) Date of Patent: Mar. 27, 2018

(54) COMBINATION EQUALIZER, INLET DISTRIBUTOR AND FIXED VALVE TRAY FOR SPHERICAL REACTOR

(71) Applicant: PHILLIPS 66 COMPANY, Houston, TX (US)

(72) Inventor: Brad P. Palmer, Fulshear, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 15/391,407

(22) Filed: Dec. 27, 2016

(65) Prior Publication Data

US 2017/0157587 A1 Jun. 8, 2017

Related U.S. Application Data

(63) Continuation-in-part of application No. 15/366,481, filed on Dec. 1, 2016, and a continuation-in-part of application No. 15/366,493, filed on Dec. 1, 2016, and a continuation-in-part of application No. 14/958,054, filed on Dec. 3, 2015, now Pat. No. 9,744,511.

(51) Int. Cl.
*B01J 8/02* (2006.01)

(52) U.S. Cl.
CPC ............. *B01J 8/0278* (2013.01); *B01J 8/025* (2013.01); *B01J 2208/00884* (2013.01); *B01J 2208/00902* (2013.01); *B01J 2208/00938* (2013.01); *B01J 2208/024* (2013.01)

(58) Field of Classification Search
CPC .. B01J 8/0278; B01J 8/025; B01J 2208/0084; B01J 2208/00902; B01J 2208/0092; B01J 2208/00938
See application file for complete search history.

(56) References Cited

U.S. PATENT DOCUMENTS 4,938,422 A * 7/1990 Koves ................... B01J 8/0278
239/553.5

\* cited by examiner

*Primary Examiner* — Lessanework Seifu
(74) *Attorney, Agent, or Firm* — Phillips 66 Company (57) ABSTRACT

The invention relates to equalizing and distributing vapor more evenly across the interior space of a reactor vessel utilizing an equalizing section and distributor section at the inlet end and a fixed valve tray at the bottom of the reactor to equalize and distribute the flow.

20 Claims, 11 Drawing Sheets

COMBINATION EQUALIZER, INLET DISTRIBUTOR AND FIXED VALVE TRAY FOR SPHERICAL REACTOR

CROSS-REFERENCE TO RELATED APPLICATIONS

This non-provisional application is a continuation-in-part application of three U.S. Applications. The first application is Ser. No. 15/366,481, filed Dec. 1, 2016 and has the title "Reactor Inlet Vapor Velocity Equalizer". The second application is U.S. application Ser. No. 15/366,493, filed Dec. 1, 2016 and has the title "Equalizing Vapor for Reactor Inlet". The third application is U.S. application Ser. No. 14/958,054, filed Dec. 3, 2015 entitled "Inlet Distributor and Fixed Valve Tray for Spherical Reactor". Applicant claims benefit under 35 USC §120 for all three applications and all of these applications are hereby incorporated herein by reference in their entirety.

STATEMENT REGARDING FEDERALLY SPONSORED RESEARCH OR DEVELOPMENT

None.

FIELD OF THE INVENTION

This invention relates to reactor design and especially to the design of inlets to reactors.

BACKGROUND OF THE INVENTION

There are many sizes and designs for reactors for converting reactants to desirable intermediates and final products. Chemical engineers expend many hours designing reactor systems to optimize reactor production considering pressure, temperature, flow rates, catalyst cost, reaction kinetics along with balancing many other issues and concerns.

It is generally understood that a generally uniform distribution of reactants in a catalyst reactor is preferred to avoid hot spots and to avoid the underutilization of catalyst in the reactor. Many inlet designs have been created to improve the distribution of reactants within reactors such as where the reactants are vaporous and have higher velocities along the outside of a bend in the piping leading to the reactor. In a reactor arrangement that is fed by a conduit with a significant bend leading into the top or bottom of a reactor, the higher velocities tend to follow the outside of the bend and concentrate along one side of the reactor. Baffles and vanes have been used for years to create back pressure on the inlet stream and cause the reactants to distribute themselves across the reactor.

Another common technique is to provide an inert support bed with a thick layer of inert support that create tortuous paths to the catalyst and causing mixing and back pressure to create a level of balance across the body of the reactor.

What is desired is a technique for creating a balanced distribution of the reactants across a rector body without significantly enlarging the size of the reactor and without creating significant back pressure on the flow of reactants.

BRIEF SUMMARY OF THE DISCLOSURE

The invention more particularly relates to a reactor vessel system that includes a shell having with an open interior space, an inlet into the interior space for the admission of reactant vapor and an outlet at the opposite end thereof to allow the exit of products where a tubular delivery conduit is arranged to provide vapor into the shell. A reactor inlet system is installed at the inlet and connected to the tubular delivery conduit to receive vapor delivered to the shell by the tubular delivery conduit and distribute the vapor into the shell for generally even flow throughout the shell wherein the reactor inlet system includes a generally hollow cylindrical body having an inlet end at a top thereof and an outlet end spaced from the inlet end at a bottom thereof which also includes a generally center axis and an interior wall, an equalizer section positioned generally within the generally cylindrical body at the inlet end, and a distributor section positioned near the outlet end of the generally cylindrical body. The equalizer section includes a flange equalizer plate positioned generally at the inlet end of the generally cylindrical body and arranged to minimally obstruct vapor entering the reactor inlet at a periphery of the tubular delivery conduit and also includes a top equalizer plate positioned within the generally hollow cylindrical body and spaced downwardly from the flange equalizer plate and spaced inwardly from the generally hollow cylindrical body to minimally obstruct vapor moving generally downwardly through the generally hollow cylindrical body nearer to the interior wall than to the generally center axis. A middle equalizer plate is positioned within the generally hollow cylindrical body and spaced downwardly from the top equalizer plate and spaced inwardly from the generally hollow cylindrical body and arranged to minimally obstruct vapor moving generally downwardly through the generally hollow cylindrical body between the interior wall and the generally center axis and closer to the generally center axis than the obstruction created by the top equalizer plate. A bottom equalizer plate is positioned within the generally hollow cylindrical body and spaced downwardly from the middle equalizer plate and spaced inwardly from the generally hollow cylindrical body and arranged to minimally obstruct vapor moving generally downwardly through the generally hollow cylindrical body nearer to the interior wall than to the generally center axis and further away from the generally center axis than the obstruction created by the middle equalizer plate. The distributor section of the reactor inlet system includes a first deflector ring with an integrally attached first neck attached to but spaced from the outlet end of the generally cylindrical body such that a circumferential nozzle is defined between the deflector ring and the outlet end of the generally cylindrical body and the neck extends from the first deflector ring away from the generally cylindrical body and at least one additional deflector ring with an integrally attached additional neck. The one additional deflector ring is attached to but spaced from the first neck such that an additional circumferential nozzle is defined between the additional deflector ring and the first neck. A deflector plate is attached to the additional deflector ring, but is spaced from said additional neck to define a last circumferential nozzle. So, the equalizer section of the reactor inlet system dampens asymmetrically distributed velocities of vapor entering the reactor inlet system to provide the distributor section with a generally symmetrically balanced velocity profile across the generally cylindrical body and the distributor section distributes the flow of vapor outwardly and downwardly from the outlet end of the inlet system such that vapor flow is generally uniform across the shell into which vapor is arranged to be delivered. A catalyst bed is supported by a perforated fixed valve tray having opening arranged to distribute the flow of gases through the perforated fixed valve tray more evenly across the interior space within the shell.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
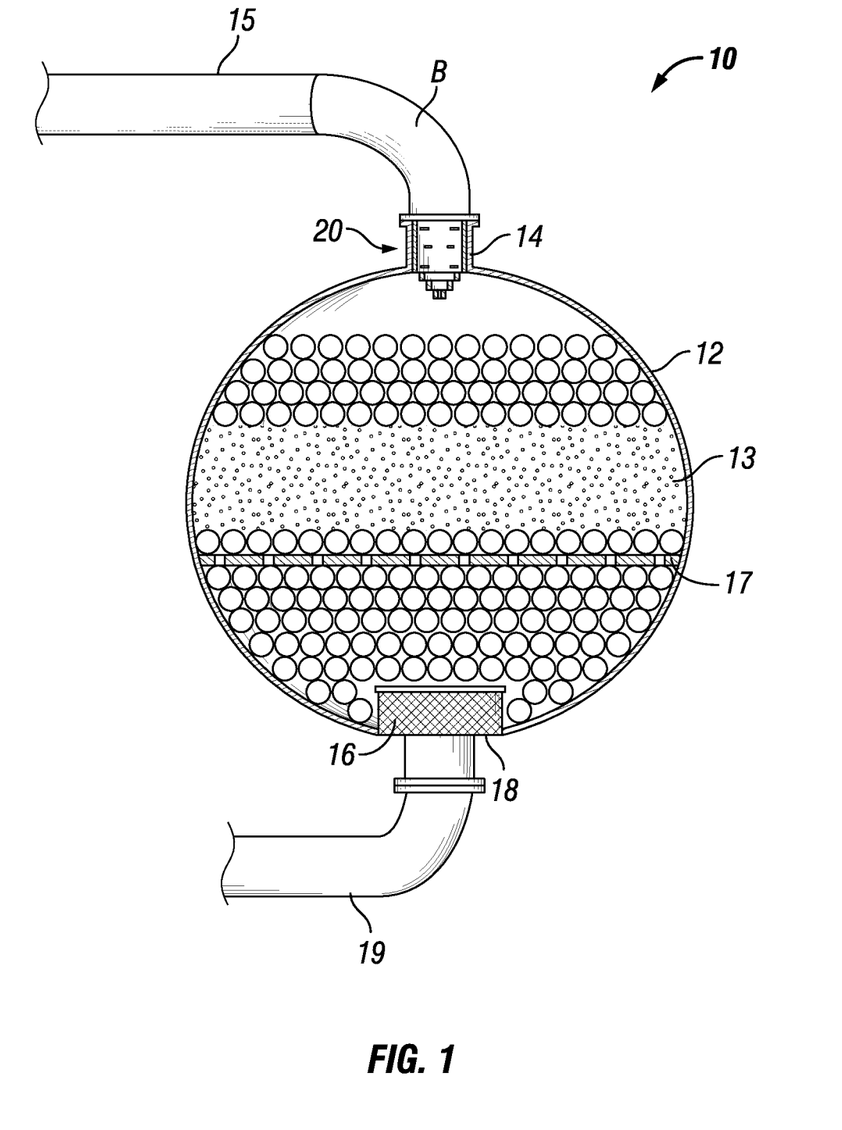
FIG. 1 is an elevation cross section of a spherical reactor showing an inventive equalizer, distributor and reactor fixed valve tray.

As shown in FIG. 1, an example reactor system is shown generally indicated by the numeral 10 comprising a reactor vessel 12 that is shown having the shape of a sphere. The example reactor vessel 12 includes a catalyst bed 13 within the reactor intermediate from the inlet end 14 and the outlet end 18 and having inert materials positioned above and below the catalyst bed 13. The example reaction vessel 12 receives reactants at the inlet end 14 via an inlet conduit 15 directing the vapor into the top of the reactor 12. While it is noted that the illustrated reactor 12 is arranged to have the reactants flow from the top down through the catalyst to exit at the bottom, which is generally preferred, the invention may work equally well with reactors that are arranged to direct the flow from the bottom up or have a horizontal flow or have the flow in other orientations. Most reactors are top down or bottom up, but the other arrangements are possible. It should also be understood that although the reactor vessel 12 is near spherical, some reactors are also elongated with somewhat spherically shaped upper and lower portions and the present invention may be useful in all of these various reactor designs. Continuing with the description of the reactor system 10, the products of the reaction are conveyed to the outlet end 18 at the bottom of the reactor where the products are conveyed away by an outlet conduit 19.

Figure 2:
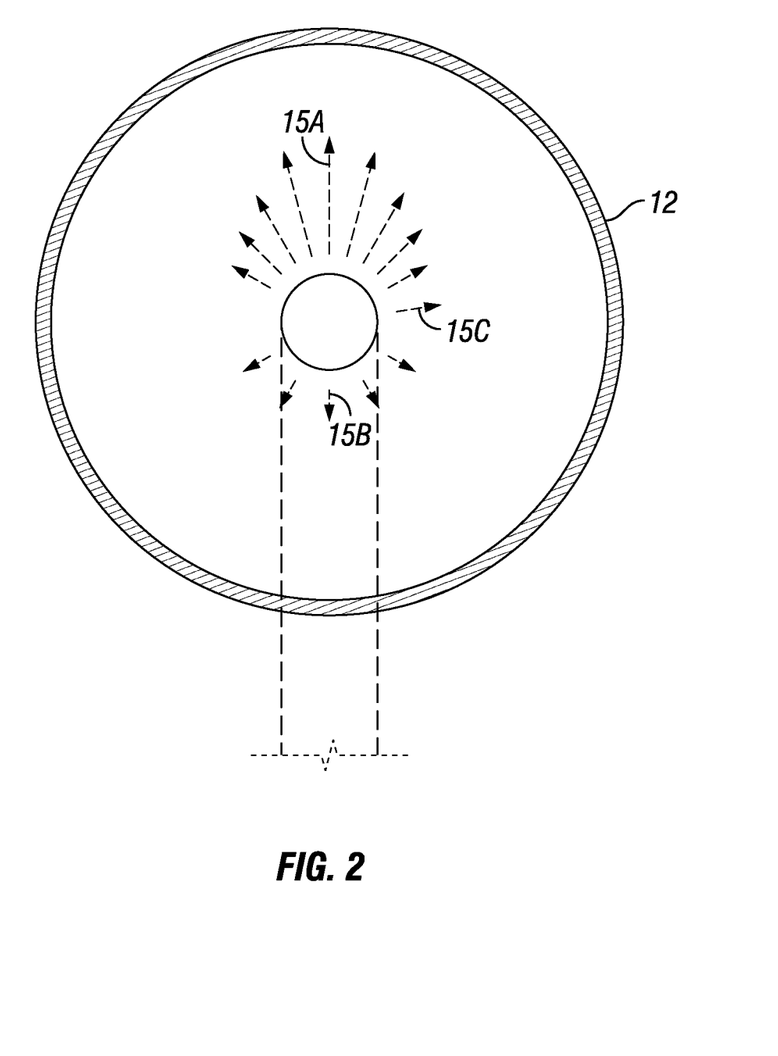
FIG. 2 is a top view of the reactor shown in FIG. 1 showing the relative velocity of the inlet stream entering the reactor without the inventive equalizer.

The inlet conduit 15 includes a bend B near the top of the reactor vessel 12 so as to turn and direct the vapor straight into the inlet end 14. One of the problems addressed by the present invention is where the uneven distribution of vapor occurs in the top of the reactor vessel 12. The inertia of the vapor moving through inlet conduit 15 around the bend B creates higher velocity vapor around the outside of the bend B as compared to the center of the conduit 15 and inlet 14 or along the inside of the bend B. This problem is best illustrated in FIG. 2 which shows a flow arrangement that is NOT desirable. Vapor moving along the directions indicated by arrow 15A is moving much faster than the vapor flow indicated by smaller arrow 15B. What would be desired is that flow in all directions across the head space above the catalyst bed 13 would be close to the same such as shown by intermediate arrow length 15C. Thus, vapor flow in direction 15A would be moderated or tempered down causing flow to increase in direction 15B such that both are about the same velocity as in direction 15C. If these flows are not balanced, the catalyst in the high velocity areas are inclined to be used up before the catalyst at the low velocity areas are used very much. In some reactors, low velocity causes excessive coking. Ultimately, productivity of the reactor system 10 is lower than optimal meaning lost production and lost profit opportunity. Any operational tricks that may be employed to increase productivity of aging catalyst are frustrated by the rapid aging of some catalyst while other catalyst is still quite fresh. Since catalyst tends to be expensive, getting as much productivity of desired products from a load of catalyst is always preferred.

Another problem this invention addresses is to create a smoother flow of vapor from the inlet end 14 out across the width of the catalyst bed 13.

The invention comprises a combination equalizer and distributor 20 at the inlet to equalize the flow of vapor across the inlet 14 and then distribute the flow outwardly across the broad width of reactor vessel 12. The combination equalizer and distributor 20 comprises an equalizer section 21 and a distributor section 51.

The equalizer section 21 is positioned near the top of the inlet end 14 to equalize the velocity of flow within the inlet end 14. It is noted that while the vapor flow would preferably be consistent as measured transversely across the inlet 14, it is suitable and likely that any velocity imbalance would be brought more into to a more symmetrically equalized arrangement such that the velocity is relatively equal all of the way around every hypothetical circle around the center or axis of the inlet end 14 while difference may exist from one circle ton another. So, it may be faster or slower at the center, but the velocity does not favor one side of the inlet 14 over another.

Turning to FIGS. 3-6, equalizer section 21 ideally imposes minimal resistance of the flow of the vapor into the reactor vessel 12 so as to not alter the intended catalyst process while getting better distribution of the vapor to utilize the full size and catalyst load in the reactor vessel 12. So, the key features of the equalizer section 21 are a flange plate 25 and three vertically spaced ring plates 30, 35 and 40 (that will be described shortly).

The flange plate 25, in addition to being a functional part of the equalizer section 21, supports the entire combination equalizer and distributor 20 in place at the inlet end 14 of the reactor vessel 12. With a relatively large diameter 25A (see FIG. 6) the flange plate 25 is pinched between the flanges of the inlet conduit 15 and the inlet end 14. A generally cylindrical duct 22 is attached to the bottom side of the flange plate 25 to extend down through the inlet 14 and perhaps into the head space of the reactor 12 above the catalyst bed 13. The flange plate 25 includes a generally circular center opening defined by diameter 25B (see FIG. 6) that is less than the inner diameter of the inlet conduit 15 and is clearly less than the inner diameter 22B (FIG. 6) of the duct 22. The smaller dimension of the generally circular opening 25A of flange plate 25 is to create an obstruction to the flow of vapors along the interior walls of the inlet conduit 15. It is believed that the flange plate 25 creates a greater obstruction for higher velocity flows of vapor than it does for any lower velocity flows of vapor. As such, the flange plate 25 provides a first obstruction to begin to balance to velocity differences entering the inlet end 14.

Figure 6:
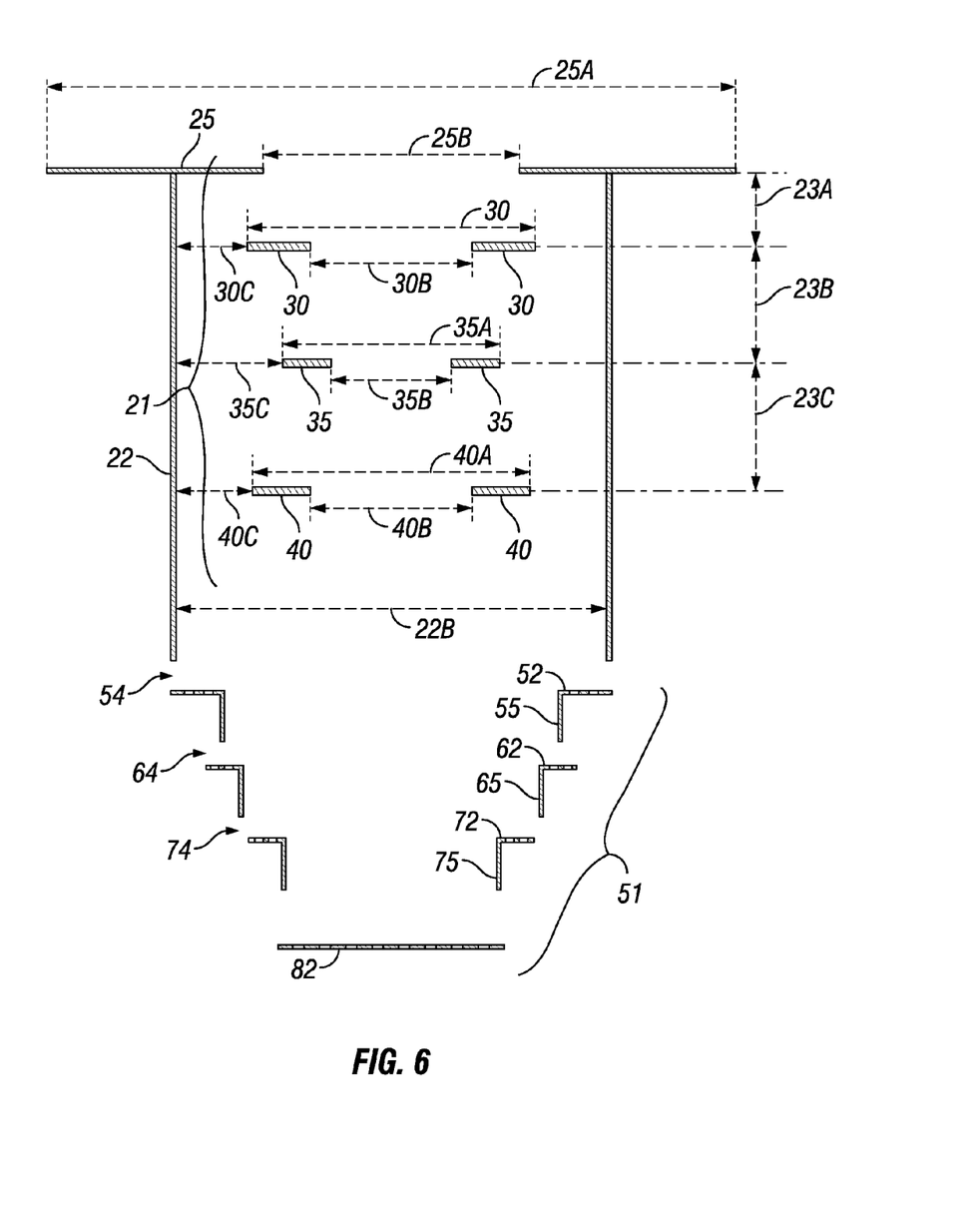
FIG. 6 is an elevation cross section of the first embodiment of the distributor showing some dimensional attributes of the equalizer and distributor.

Equalizer section 21 further includes a number of longitudinal vanes 28 (FIG. 4) spaced around the duct 22 for supporting cross vanes 29A, 29B and 28C (FIGS. 3 and 4) which extend transversely across the duct 22. The first set of cross vanes 29A are top cross vanes 29A which are positioned at a first position below the flange plate 51 by a distance 23A (FIG. 6). In the preferred arrangement, two cross vanes 29A are attached by their ends to each of four longitudinal vanes 28 forming an "X" shape generally horizontal or transversely across the duct 22. Similarly, the second set of cross vanes are middle cross vanes 29B and are positioned at a second position below top cross vanes 29A by a dimension 23B (FIG. 6) which may or may not be the same as 23A. Again, in the preferred arrangement, middle cross vanes 29B are attached at their ends to four longitudinal vanes 28, but to the four longitudinal vanes 28 that are not attached to the top cross vanes 29A. Also similarly, the third set of cross vanes are bottom cross vanes 29C and are positioned below middle cross vanes 29B by a distance 23C (FIG. 6) which may or may not be the same as either of 23A or 23B. Again in the preferred arrangement, bottom cross vanes 29C are attached by their ends to four longitudinal vanes 28 which are the same four longitudinal vanes 28 that support the top cross vanes 29A. All of the cross vanes 29A, 29B and 29C are intended to support the spaced ring plates 30, 35, and 40, but not, by themselves, have much impact on the flow of vapor through the duct 22. It should be noted that in some circumstances, such as for large diameter vessels or for very high flow rates, it may be desirable to provide four cross vanes with ends of each attached to the eight longitudinal vanes to support each of the spaced ring plates 30, 35 and 40.

Top ring plate 30 is mounted on the "X" shaped top cross vanes 29A. Preferably, the top ring plate 30 is relatively flat, having a thickness of less than 0.5 inches with an outer diameter 30A and an inner diameter 30B. Focusing especially on FIG. 6, the outer diameter 30A is less than the inner diameter 22B of the duct 22 and spaced away from the wall of duct 22 by an annular space 30C. Ideally, the top ring plate 30 is a perfect circle with a perfectly circular opening in the middle that is also perfectly concentric to the circular shape of the duct 22 and the opening in the top flange plate 25. The difference between the inner diameter 30B and outer diameter 30A gives a ring face area. A greater ring face area tends to increase the obstruction to vapor flow while a reduced ring face area similarly creates less obstruction to the vapor flow. In one preferred arrangement, top ring plate 30 includes a series of small holes 31 to reduce total ring face area. The amount of pressure drop created by top ring 30 is complicated in that there are many inputs to be considered such as the velocity of the vapor, the density and viscosity of the vapor, the ring face area and the turbulence that will be created by the size and shape of the ring face area, and even the thickness of the top ring plate 30. The holes 31 provide an additional design option for creating a desired pressure drop for the flow of vapor where a small but non-zero pressure drop may be imposed in a manner that impedes high velocities at the outside walls of the inlet conduit 15 and duct 22 and thereby balance asymmetrically distributed velocities of vapor in such spaces. While it is desirable to obtain uniform velocity across the neck as the vapor enters the interior space of the reactor vessel 12, the equalizer section 21 is focused on making the velocity profile more symmetrically balanced around the axis of the inlet 14. So, for each coaxial circle around the axis of the duct 22 at the bottom end thereof has a fairly consistent velocity of vapor all the way around that particular circle, and all such rings have fairly consistent velocity as compared to the same analysis that could be done in the conduit 15 before the vapor passes through the equalizer section 21. This allows that two different circles may have different velocities, but the variation is from one circle to another and not within a circle defined at any distance from the center axis of the duct 22.

Middle ring plate 35 is similarly mounted on top of the "X" shaped middle cross vanes 29B. Preferably, the middle ring plate 35 is also relatively flat, having a thickness similar to the top ring plate 30 with an outer diameter 35A and an inner diameter 35B. The middle ring plate 35 is smaller than the top ring plate 30 such that the outer diameter 35A of middle ring plate 35 is less than the outer diameter 30A of the top ring plate 30. While the outer diameter 35A of the middle ring plate 35 may be larger, about the same size as, or smaller than the inner diameter 30B of the top ring 61, it is preferred that the outer diameter 35A of the middle ring plate 35 is about the same as or less than the inner diameter 30B of the top ring plate 30. In one preferred arrangement, middle ring plate 35 includes a series of small holes 36 to reduce total ring face area of middle plate 35.

Bottom ring plate 40 is similarly mounted to the top of the "X" shaped bottom cross vanes 29C. Preferably, the bottom ring plate 40 is also relatively flat, having a thickness like the top ring plate 30 and middle ring plate 35. The bottom ring plate 40 has an outer diameter 40A and an inner diameter 40B. The bottom ring plate 40 is larger than the middle ring plate 35 such that the outer diameter 40A of the bottom ring plate 40 is larger than the outer diameter 35A of the middle ring plate 35 and actually where the inner diameter 40B of the bottom ring plate 40 is about the same dimension as the outer diameter 35A of the middle ring plate 35. In various embodiments, the inner diameter 40B of the bottom ring plate 40 is about the same dimension or less than the outer diameter 35A of the middle ring plate 35. In another further option, bottom ring plate 40 includes a series of small holes 41 to reduce total ring face area of bottom plate 40.

Each of the flange plate 25 and ring plates 30, 35 and 40 are sized and arranged to create an obstruction to vapor flow through the duct 22. But the obstruction is intended and designed to impose a limited restriction or pressure drop so as not to alter the underlying design parameters of the reactor system, but only create a better velocity balance of the vapor inlet flow across the full transverse dimension of the generally duct 22. So, some pressure drop is desired. Ideally, the pressure drop is at least 0.025 pounds per plate and less than about 0.25 pounds of pressure drop at each plate. It is also believed that optimal results are created when the total pressure drop created by the equalizer section 21 is between 0.25 and 0.75 pounds, total. The number and diameter of the holes 31, 36 and 41 in ring plates 30, 35 and 40 that allow vapor to pass through each of the ring plates 30, 35 and 40 effect the pressure drop along with the overall sizes of the plates including the thickness of each plate. It should also be recognized that the gas hourly space velocity of the vapor, the density and viscosity of the vapor and pressure of the vapor are generally established for a reactor system, but will also have a significant effect on pressure drop across the plates.

Figure 5:
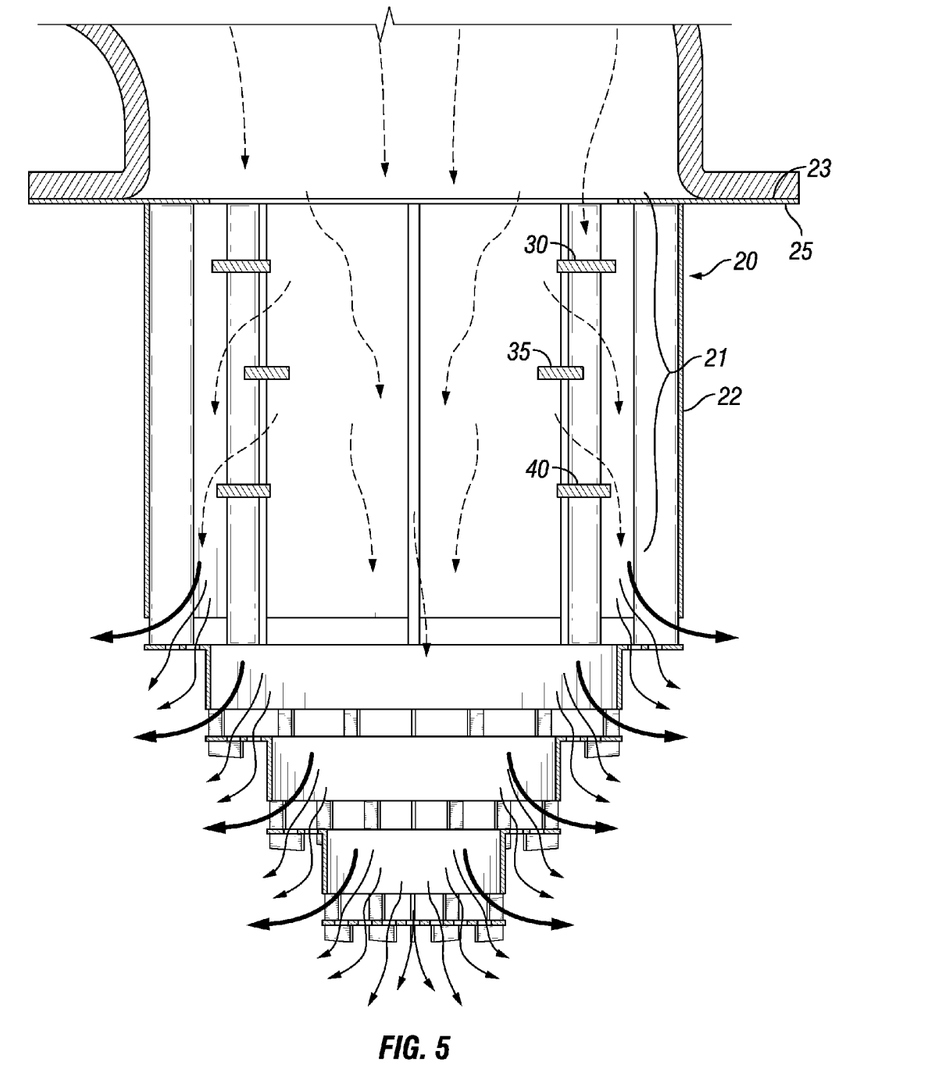
FIG. 5 is an elevation cross section of the first embodiment of the distributor showing the aerodynamics of the equalizer and distributor.

Turning now to FIG. 5, where arrows show the expected flow into and through the duct 22, the highest vapor velocities are expected to be concentrated at the outer wall of the conduit 15 due to the overall vapor velocity and to bend B turning the vapor into the top of the reactor vessel 12. As shown, the equalizer section 21 impedes the higher velocity flows around the outside of the conduit 15 allowing flow to go through the center of the duct 22 less impeded. The flange plate 25 forces the vapor flow toward the center of the duct 22 and each of the successive ring plates forces or causes flow of vapor to deviate around or be partially obstructed by the successive ring plates 30, 35 and 40 such that the only substantially flow path of nearly linear flow is through the center or along the axis of the duct 22. Flow outside of about the center 20% to 25% of the cross sectional area of the duct 22 is at least partially obstructed to reduce or temper down the high velocity flows such that near the bottom end of the duct 22 causing the flow to be generally equalized or caused to be more symmetrical. With these alterations of the flow of vapor without creating excessive back pressure or pressure drop, it is expected that the performance of the reactor system 10 will be improved with longer run time, more efficient use of the catalyst, and higher productivity.

Figure 3:
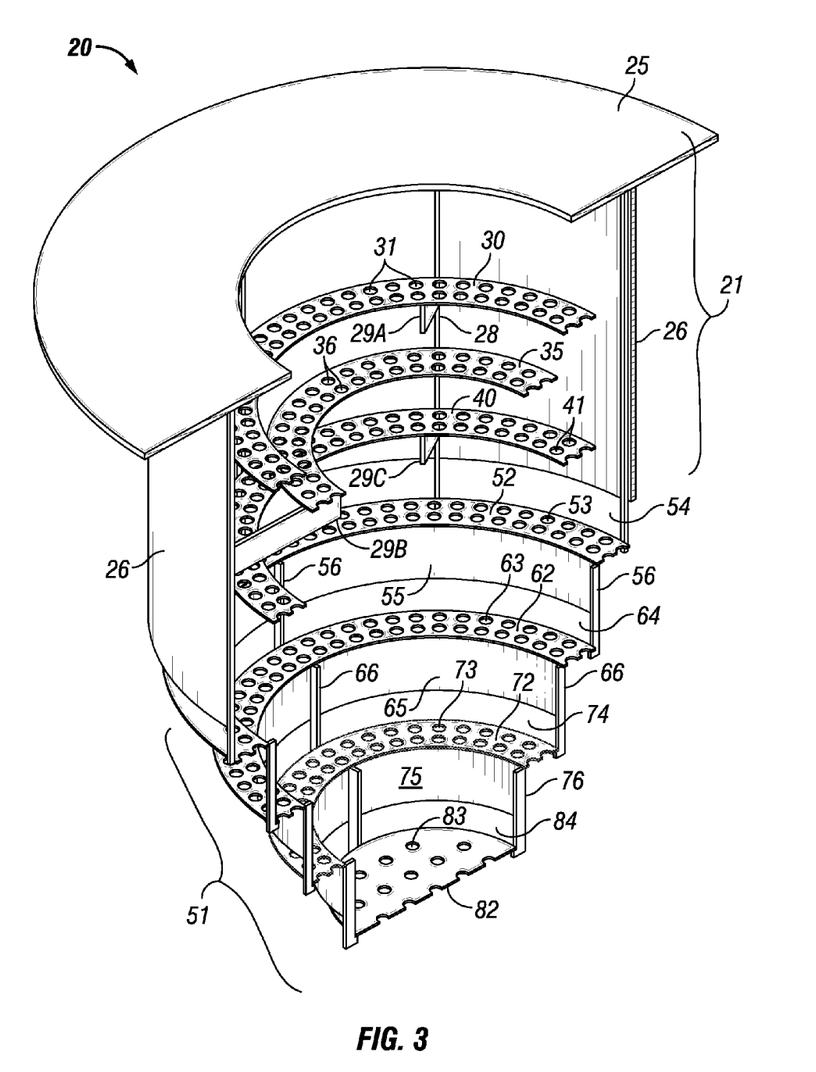
FIG. 3 is a perspective view of a cross section of the first embodiment of the inventive equalizer and distributor.
Figure 4:
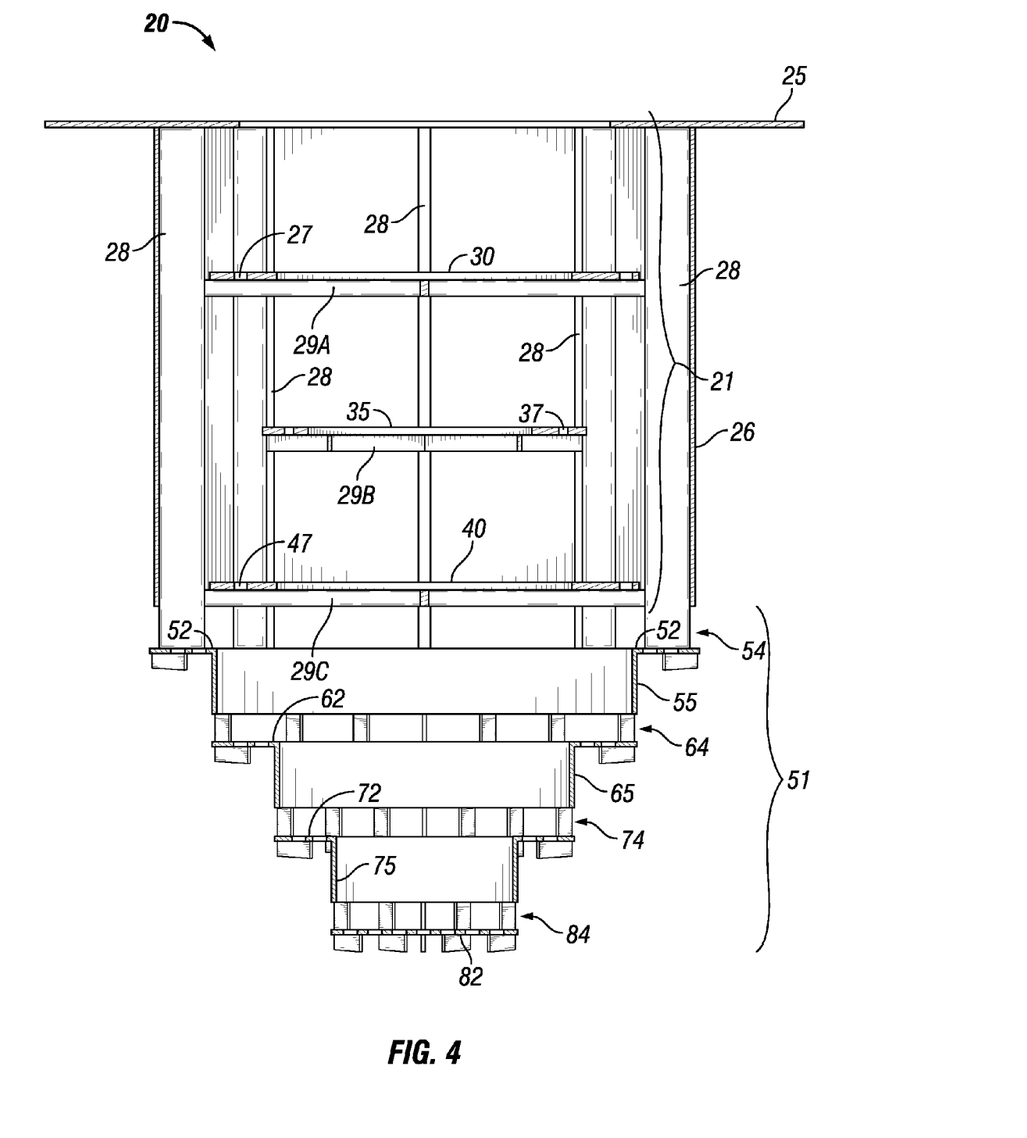
FIG. 4 is an elevation cross section of the first embodiment of the equalizer and distributor.

The equalizer section 21 is intended to enhance the performance of the distributor section 51. So, turning now to the distributor section 51, the vapor flowing into the interior of the reactor vessel 12 is to be spread out and preferably evenly dispersed across the head space of the reactor vessel 12 above the catalyst bed 13. The distributor section 51 has a configuration that imposes a very modest or low back pressure on the flow of the vapor and, at the same time, splits and directs the flows of the vapor in a manner that more evenly disperses the vapor. In a first embodiment of the distributor section 51, FIGS. 3, 4 and 5 show the distributor section 51 being positioned below the equalizer section 21 at the base end of the duct 22 and which includes a series of circumferential or radial nozzles to split and direct flows. The radial nozzles are indicated at 54, 64, 74 and 84.

Focusing on FIG. 3, longitudinal vanes 28 support a first perforated deflector ring 52 at a position spaced from the bottom end of the duct 22. The first perforated deflector ring 52 has a large, generally circular opening in the middle thereof and a generally circular outer diameter that is about the same as the diameter of the duct 22. The generally uniform spacing from the end of the duct 22 to the perimeter of the first perforated deflector ring 52 defines the first radial nozzle 54. The first perforated deflector ring 52 is also relatively thin compared to its diameter with holes 53. The first perforated deflector ring 52 is preferably constructed from flat sheet metal stock with holes punched through from top to bottom. The first perforated deflector ring 52 is intended to reduce the area of the duct 22 by about 5% to 20% (but more preferably between 10% and 15%) forcing a first portion of the vapor out of the distributor section 51 along the wall of the reactor vessel 12 at the highest portion of the open headspace above the catalyst bed 13.

In particular, first perforated deflector ring 52 provides some modest resistance to the flow of reactants into the reactor vessel 12 and divides the flow within the duct 22 into two large flow paths and a plurality of smaller flow paths. The first large flow path being through the center of the perforated deflector ring 52 and the second large flow path being through the radial nozzle 54 around the perimeter of the first perforated deflector ring 52. The smaller flow paths are through the numerous holes 53. A first cylindrical neck 55 is attached to the inner diameter of the first perforated deflector ring 52 to extend a short distance below the first perforated deflector ring 52. A series of stanchions 56 are attached vertically along the inside of the first cylindrical neck 55 and arranged to extend downwardly beyond the lower edge of the generally cylindrical neck 55 for supporting a second perforated deflector ring 62. The second perforated deflector ring 40 is constructed in a manner similar to the construction of the first perforated deflector ring 52 where it is generally flat with through holes 63. The outer diameter of the second perforated deflector ring 62 is slightly less than the diameter of the generally cylindrical neck 55 and the inner diameter provides for a rather large circular opening to allow most of the reactants flowing down through the distributor section 51 to continue to flow downwardly. The second perforated deflector ring 62 reduces the original area of the duct 22 by another 5% to 20%.

The second perforated deflector ring 62 is positioned in a similar manner below the first cylindrical neck 55 to form the second radial nozzle 64 by being attached to the stanchions 56. The outer edge of the second perforated deflector ring 50 is slightly smaller than the inner diameter of the first neck 45, and like the first perforated deflector ring 52, the second perforated deflector ring 62 includes a second cylindrical neck 65 attached along the inner dimension (inner diameter) of the second perforated deflector ring 62.

A third perforated deflector ring 72 is positioned in a similar manner below the second perforated deflector ring 62 and continues a stair step pattern of reducing diameters with generally circular central openings and with successive radially oriented nozzles of reduced diameter along the periphery of the distributor section 51. As before, the third perforated deflector ring 72 is spaced from the lower edge of the second neck 65 defining the third radial nozzle 64. Again, the outer edge of the third perforated ring 72 is slightly smaller than the inner diameter of the second neck 65.

While additional deflector rings may be incorporated into the design, two three or four are generally preferred, but ultimately, the bottom of the deflector section 51 is defined by a deflector plate 82. Deflector plate 82 is mounted to the third deflector ring 72 in a manner similar to the deflector rings 52, 62 and 72. A third neck 75, having a generally cylindrical design, is attached to the inner edge of the third perforated deflector ring 72 and arranged to extend further into the reactor vessel 12. Stanchions 76 are attached to the inner surface of the third neck 75 and arranged to extend below the lower edge of the third neck 75. The deflector plate 82 being spaced below the lower edge of the third neck 75 defines the fourth generally radial nozzle 84.

The deflector plate 82, similar to the deflector rings 52, 62 and 72, has through holes 83 to allow reactants to pass down through the middle of the distributor section 51 and enter into the middle of the reactor vessel 12. However, as shown in FIG. 5, the radial nozzles direct a significant portion of the reactants radially outward, or with a significant radially outward direction component along with some downward direction of flow with the through holes 53, 63, 73 and 83 to permit a smaller amount of flow to fill in between the primary flows through the nozzles 54, 64, 74 and 84.

There are many variations on the preferred arrangements for the distributor section 51. The drawings show three perforated deflector rings, however, it should be understood that the invention may comprise two deflector rings, three deflector rings, four deflector rings and even more perforated deflector rings, although between two and four are preferred.

Figure 7:
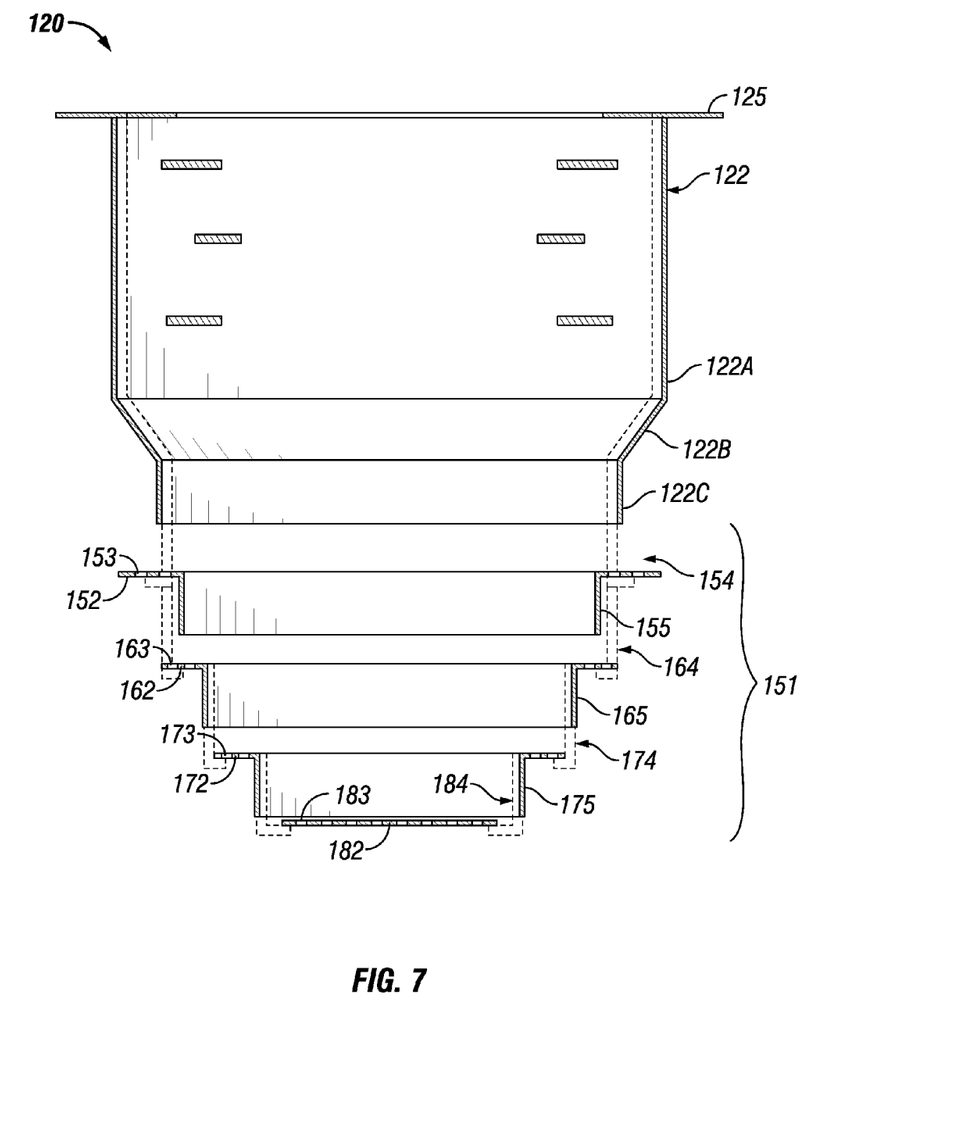
FIG. 7 is an elevation cross section of the equalizer with a second embodiment of the distributor.
Figure 8:
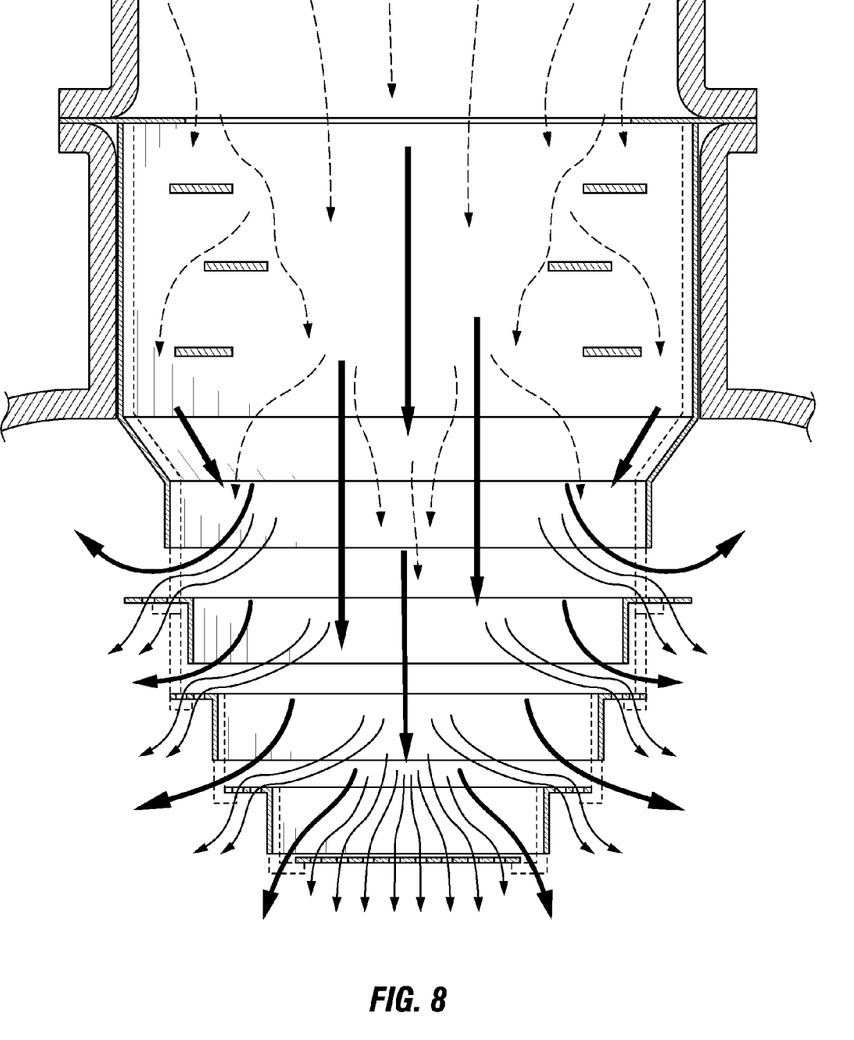
FIG. 8 is an elevation cross section of the equalizer with a second embodiment of the distributor showing the aerodynamics of the distributor.

In FIG. 7, another arrangement of the distributor section 51 is shown using the same numbering as in FIGS. 3-6, but adding "100" so that the second embodiment of the distributor section has the number 151. In this second arrangement, the generally cylindrical duct 122 has a more complex form with a first cylindrical section 122A connected to an inverted conical section 122B forming a reducing cross section for the distributor section 151 and then continuing with a smaller, but generally cylindrical second cylindrical section 122C. In this arrangement, the first perforated deflector ring 152 has an outer diameter that is larger than the diameter of the second cylindrical section 122C. As such, the first circumferential nozzle 152 is oriented to provide a much more radial orientation to the flow of reactants entering the reactor vessel 12 than the first circumferential nozzle 54 in the first embodiment of the distributor section 51 perhaps along with some upward component direction of flow. Similarly, the second perforated deflector ring 162 has an outer diameter that is slightly larger than the diameter of the first neck 155. As such, the second circumferential nozzle 154 also provides a more radial orientation to the flow of the reactants than the second radial or circumferential nozzle 54 in the first described embodiment although it should appear from the drawings that it will not impose as much of an upward flow as the first circumferential nozzle 142 of this embodiment. The third circumferential nozzle 174 is constructed and oriented in a manner very comparable to the circumferential nozzles of the first described embodiment, however, the last circumferential nozzle 184 has a much more axial orientation to due to the deflector plate 170 being smaller than the third neck 175 and with the deflector plate 182 being in closer vertical proximity to the bottom edge of the third neck 175 than the deflector rings are vertically spaced from the collars above. In this arrangement, each successive circumferential nozzle directs the flow of reactants radially outwardly and somewhat upwardly nearest the top of the reactor vessel 12 and in successively and progressively downward angles as shown in FIG. 8.

Figure 9:
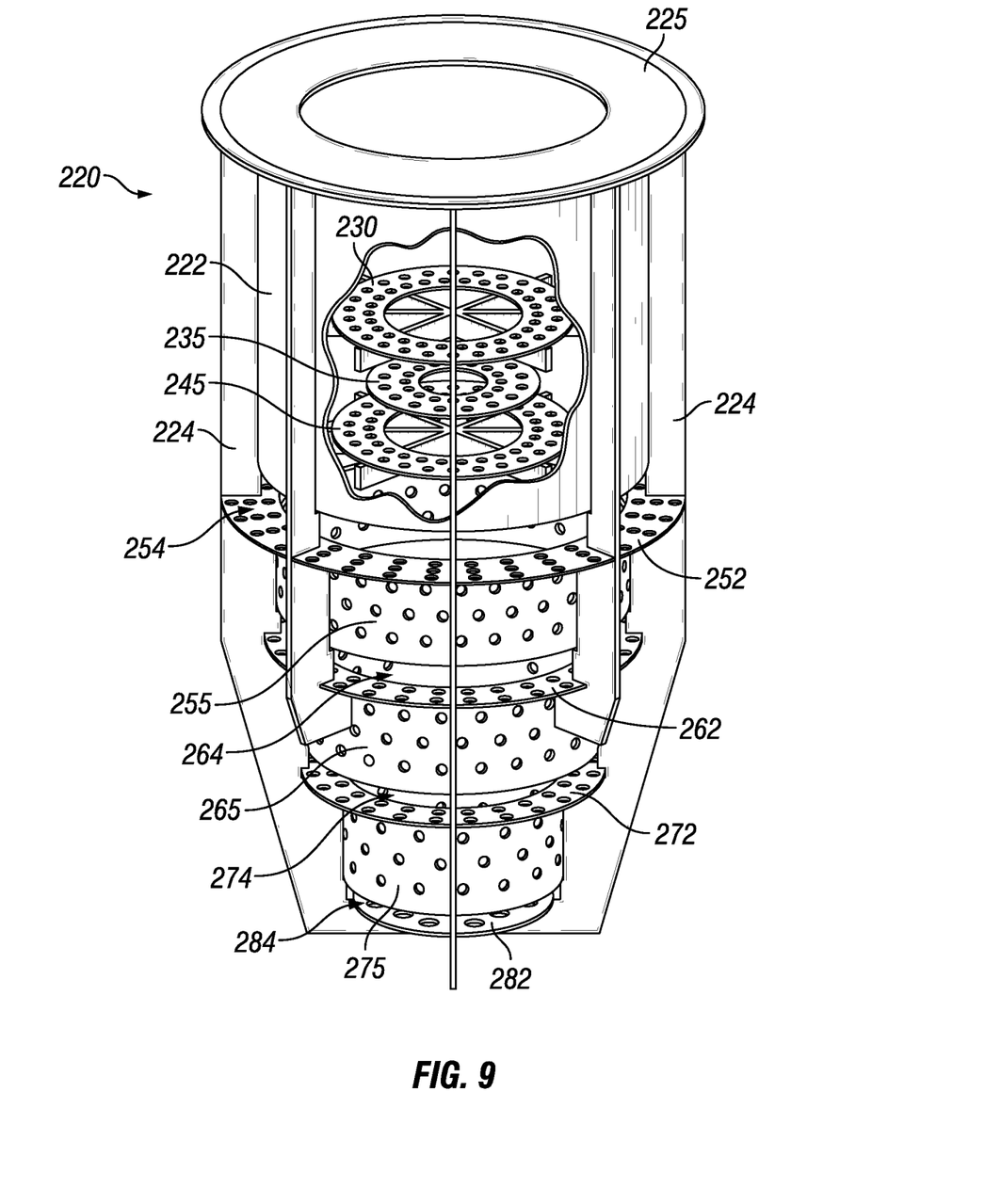
FIG. 9 is a perspective view of the equalizer in combination with a third embodiment of the distributor.
Figure 10:
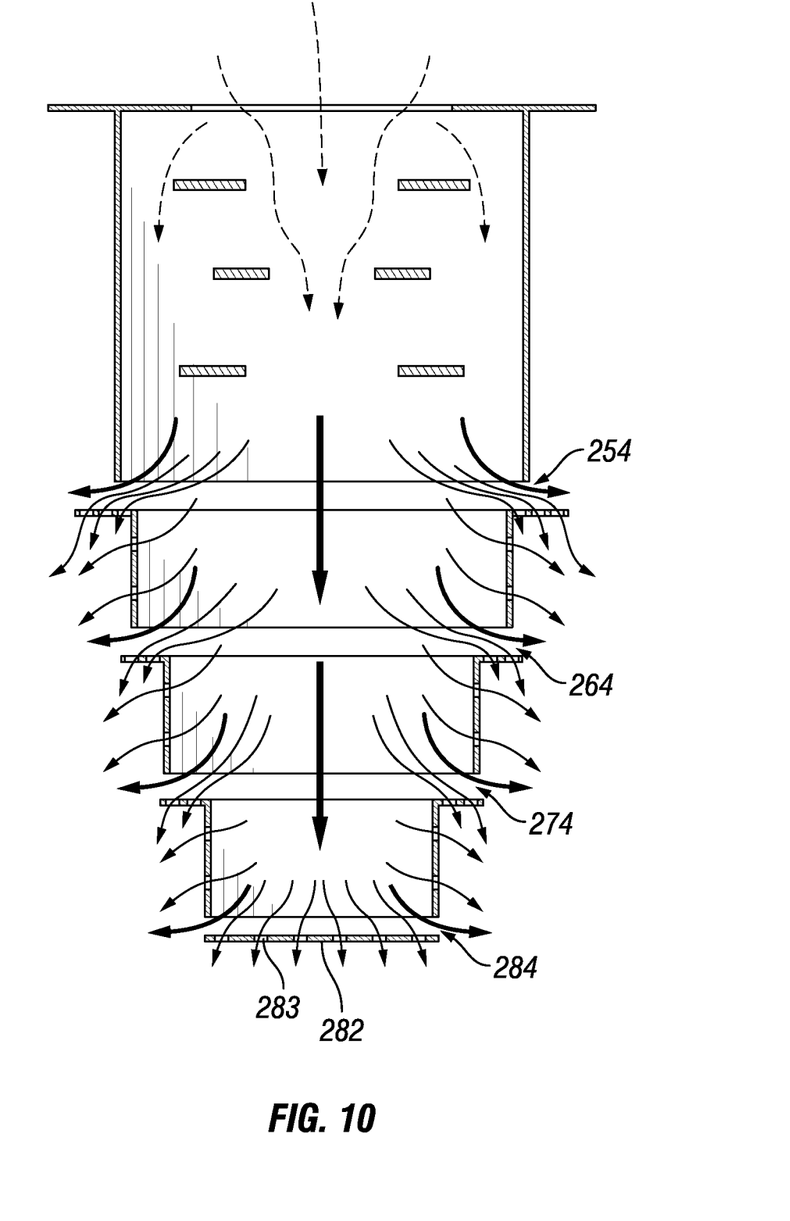
FIG. 10 is an elevation cross section of the combination of the equalizer and third embodiment of the distributor focusing on the aerodynamics created for incoming vapor.

A third variation of the distributor section is shown as 251 in FIGS. 9 and 10. This embodiment includes an aspect where the support structure for the equalizer and distributor sections is arranged on the outside of the generally duct 22 and along the outside of the deflector rings and necks. The longitudinal vanes and stanchions are replaced by oversized braces 224. The first perforated deflector ring 252 of this third embodiment, similar to the first deflector ring 152 in the second embodiment, has a larger diameter than the generally cylindrical duct 22 and thereby forms a first circumferential nozzle 254 that provides some portion of upwards or backwards flow while primarily delivering the vapor in a very radial orientation into the reactor vessel 12. Focusing on FIG. 10, like the distributor section 151 of the second embodiment, the successive circumferential or radial nozzles have a progressively more downward orientation. In this third embodiment, the through holes 283 in the deflector plate 282 are larger than the through holes through the deflector rings to allow more of the reactants to flow through the deflector plate 282. At the same time, the last or fourth circumferential nozzle 284 in the third embodiment is oriented more radial and less axial than the last or fourth circumferential nozzle 184 of the second embodiment due to the larger holes 283. Another noteworthy difference is that the necks 255, 265, and 275 are slightly longer and are also perforated in this third embodiment. While the majority of the reactants are passing through the circumferential nozzles, flow is also emanating from the numerous through holes in the deflector rings, necks and deflector plate.

Figure 11:
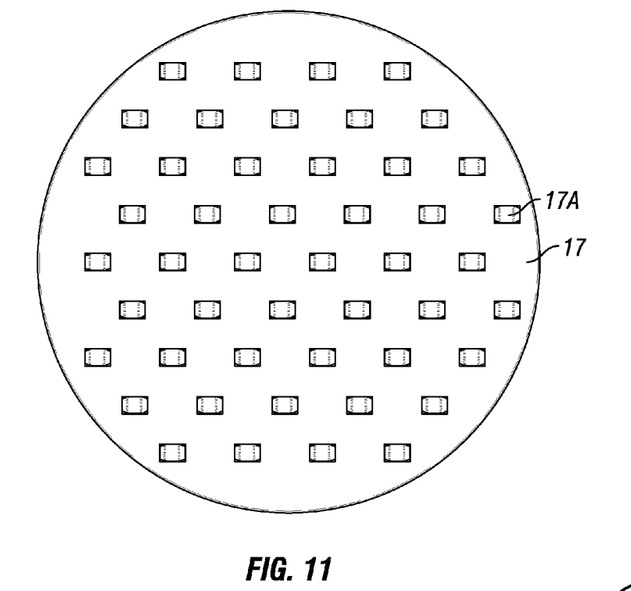
FIG. 11 is a top view of the reactor fixed valve tray.
Figure 12:
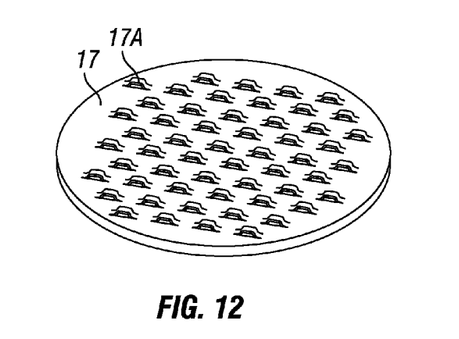
FIG. 12 is perspective view of the reactor fixed valve tray.
Figure 13:
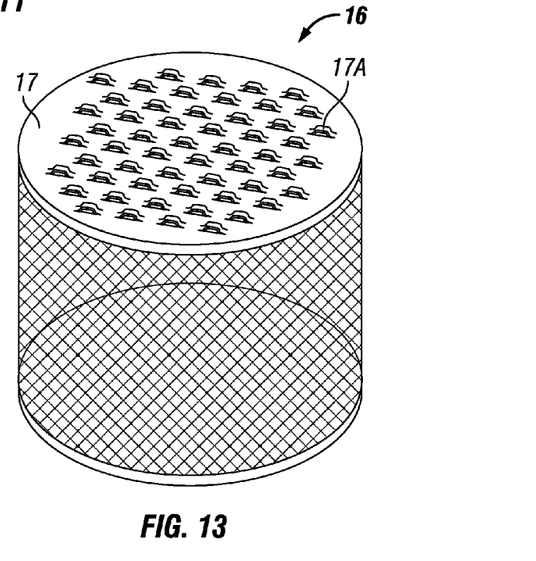
FIG. 13 is a perspective view of an alternative installation where the valve tray is installed on the top of the outlet device sometimes called an elephant stool.

In conjunction with the vapor handler 20, one aspect of the present invention is to make sure that the vapor flow, and eventually the products, is distributed across reactor vessel 12 as evenly as practical by using a fixed valve tray 17 positioned under the catalyst bed, but on top of the inert material. The fixed valve tray 17 is constructed of a generally circular plate having the diameter to match the portion of the reactor vessel 12 at the level to which it is to be installed. The fixed valve tray 17 includes spaced apart openings 17A. As seen in FIGS. 11, 12 and 13, the openings are formed to allow flow of products but prevent passage of the catalyst. With an even spacing across the fixed valve tray 17, velocity differences across the width of the reactor vessel 12 would be suppressed by the size and spacing of the openings so as to restrict the localized rate at which the products may leave the catalyst bed 13. This provides another basis for forcing a more balanced rate of flow through the reactor vessel 12.

As seen in FIG. 13, the flow may also be altered to reduce a higher velocity flow through the center of the catalyst bed 13 and thereby gain more balanced flow across the width of the catalyst bed 13 by using a plate similar to the valve tray installed at the top of the outlet of the reactor vessel 12 to prevent the flow from taking the most direct path down the middle of the reactor vessel 12. In this location, sometimes described as an elephant stool, an open mesh-like material surrounds the perimeter that is less restrictive of flow while the top surface is more restrictive of flow.

It should be recognized that the combination of the equalizer section 21 and the distributor section 51 with the deflector 17 at the end thereof, can work together to get the vapors to the catalyst in a more even distribution into the catalyst bed 13 with minimal pressure drop. As such, the total productivity and instantaneous productivity of the reactor system 10 and the load of catalyst will be more optimal. Total productivity includes considerations of run time where continued productivity is still satisfactory so as to suggest continued running without shutting down for loading and new batch of catalyst.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A reactor vessel system comprising:
   a) a shell having an open interior space within the shell, an inlet into the interior space for the admission of reactant vapor and an outlet at the opposite end thereof to allow the exit of products;
   b) tubular delivery conduit arranged to provide vapor to the shell;
   c) a reactor inlet system installed at the inlet and connected to the tubular delivery conduit to receive vapor delivered to the shell by the tubular delivery conduit and distribute the vapor into the shell for generally even flow through the shell wherein the reactor inlet system comprises:
      i) a generally hollow cylindrical body having an inlet end at a top thereof and an outlet end spaced from the inlet end at a bottom thereof and also including a generally center axis and an interior wall, an equalizer section positioned generally within the generally cylindrical body at the inlet end, and a distributor section positioned near the outlet end of the generally cylindrical body;
      A) said equalizer section comprising:
         i) a flange equalizer plate positioned generally at the inlet end of the generally cylindrical body and arranged to minimally obstruct vapor entering the reactor inlet at a periphery of the tubular delivery conduit;
         ii) a top equalizer plate positioned within the generally hollow cylindrical body and spaced downwardly from the flange equalizer plate and spaced inwardly from the generally hollow cylindrical body and arranged to minimally obstruct vapor moving generally downwardly through the generally hollow cylindrical body nearer to the interior wall than to the generally center axis;
         iii) a middle equalizer plate positioned within the generally hollow cylindrical body and spaced downwardly from the top equalizer plate and spaced inwardly from the generally hollow cylindrical body and arranged to minimally obstruct vapor moving generally downwardly through the generally hollow cylindrical body between the interior wall and the generally center axis and closer to the generally center axis than the obstruction created by the top equalizer plate;
         iv) a bottom equalizer plate positioned within the generally hollow cylindrical body and spaced downwardly from the middle equalizer plate and spaced inwardly from the generally hollow cylindrical body and arranged to minimally obstruct vapor moving generally downwardly through the generally hollow cylindrical body nearer to the interior wall than to the generally center axis and further away from the generally center axis than the obstruction created by the middle equalizer plate;
      B) said distributor section comprising:
         i) a first deflector ring with an integrally attached first neck attached to but spaced from the outlet end of the generally cylindrical body such that a circumferential nozzle is defined between the deflector ring and the outlet end of the generally cylindrical body and the neck extends from the first deflector ring away from the generally cylindrical body;
         ii) at least one additional deflector ring with an integrally attached additional neck, where the one additional deflector ring is attached to but spaced from the first neck such that an additional circumferential nozzle is defined between the additional deflector ring and the first neck; and
         iii) a deflector plate attached to said additional deflector ring, but spaced from said additional neck to define a last circumferential nozzle;
      ii) wherein the equalizer section of the reactor inlet system dampens asymmetrically distributed velocities of vapor entering the reactor inlet system to provide the distributor section with a generally symmetrically balanced velocity profile across the generally cylindrical body and the distributor section distributes the flow of vapor outwardly and downwardly from the outlet end of the inlet system such that vapor flow is generally uniform across the shell into which vapor is arranged to be delivered; and
   d) a catalyst bed supported by a perforated fixed valve tray having opening arranged to distribute the flow of gases through the perforated fixed valve tray more evenly across the interior space within the shell.

2. The reactor vessel system set forth in claim 1 wherein the deflector rings include through holes to allow reactants to pass through.

3. The reactor vessel system set forth in claim 1 wherein the deflector plate includes through holes to allow reactants to pass through.

4. The reactor vessel system set forth in claim 1 wherein the necks include through holes to allow reactants to pass through.

5. The reactor vessel system set forth in claim 1 wherein the first circumferential nozzle has a diameter and each successive circumferential nozzle has a smaller diameter than the one closer to the generally cylindrical neck where the last circumferential nozzle has the smallest diameter.

6. The reactor vessel system set forth in claim 1 wherein the reactor inlet distributor has an axis and the first deflector ring has a larger diameter than the portion of the generally cylindrical body nearest the first deflector ring such that the first circumferential nozzle is oriented to direct reactants mostly radially outward away from the axis of the reactor inlet distributor, but also with a small reverse axially oriented component of direction such that reactants turn from the axial flow within the reactor inlet distributor to flowing in a direction slightly more than 90 degrees to the axial flow of the reactor inlet distributor.

7. The reactor vessel system set forth in claim 6, wherein each successive deflector ring after the first deflector ring has a diameter relative to the neck of the prior deflector ring so as to impose a successively less reverse component of flow at each successive circumferential nozzle wherein at least the last two circumferential nozzles in the series of circumferential nozzles from the first circumferential nozzle to the last circumferential nozzle create a turn of less than 90 degrees to the axial flow of the reactor inlet such that at least the last two include a continuing forward component of flow while having a radially outward component of flow.

8. The reactor vessel system set forth in claim 1 wherein the flange equalizer plate has an outer diameter and an inner diameter such that the inner diameter defines a central hole through the flange equalizer plate and wherein the outer diameter of the flange equalizer plate is at least as large as the internal cross sectional dimension of the generally cylindrical body, the inner diameter of the flange equalizer plate is smaller than the internal cross sectional dimension of the generally cylindrical body and the flange equalizer plate effectively restricts the cross sectional area of the generally cylindrical body by at least 5%.

9. The reactor vessel system set forth in claim 8 wherein the flange equalizer plate restricts the cross sectional area of the body by at least 10%.

10. The reactor vessel system set forth in claim 9 wherein the flange equalizer plate restricts the cross sectional area of the body by at least 15%.

11. The reactor vessel system set forth in claim 8 wherein the top equalizer plate has an outer diameter and an inner diameter such that the inner diameter defines a central hole through the top equalizer plate and wherein the outer diameter of the top equalizer plate is less than the inner diameter of the generally cylindrical body by at least 10% of the inner diameter of the generally cylindrical body and wherein the inner diameter of the top equalizer plate is at least 50% of the diameter of the generally cylindrical body.

12. The reactor vessel system set forth in claim 11 wherein the top equalizer plate has an outer diameter and an inner diameter and wherein the outer diameter of the top equalizer plate is about the same as the diameter of the inner diameter of the flange equalizer plate.

13. The reactor vessel system set forth in claim 12 wherein the outer diameter of the top equalizer plate is less than the inner diameter of the inner wall of the generally cylindrical body by at least 15% of the inner diameter of the inner wall of the generally cylindrical body.

14. The reactor vessel system set forth in claim 13 wherein the outer diameter of the top equalizer plate is less than the inner diameter of the inner wall of the generally cylindrical body by at least 20% of the inner diameter of the wall of the generally cylindrical body.

15. The reactor vessel system set forth in claim 12 wherein the middle equalizer plate has an outer diameter and an inner diameter and wherein the outer diameter of the middle equalizer plate is about the same as the inner diameter of the top equalizer plate.

16. The reactor vessel system set forth in claim 15 wherein the bottom equalizer plate has an outer diameter and an inner diameter and wherein the inner diameter of the bottom equalizer plate is about the same as the outer diameter of the middle equalizer plate.

17. The reactor vessel system set forth in claim 12 wherein the top equalizer plate has an outer diameter and an inner diameter and wherein the outer diameter of the top equalizer plate is greater than the diameter of the inner diameter of the flange equalizer plate.

18. The reactor vessel system set forth in claim 17 wherein the middle equalizer plate has an outer diameter and an inner diameter and wherein the outer diameter of the middle equalizer plate is greater than the inner diameter of the top equalizer plate and further wherein the bottom equalizer plate has an outer diameter and an inner diameter and wherein the inner diameter of the bottom equalizer plate is less than the outer diameter of the middle equalizer plate.

19. The reactor vessel set forth in claim 1 wherein the spacing between the flange plate and the equalizer plates are at least four inches apart vertically within the generally cylindrical body so that the top plate is at least 4 inches from each of the flange plate and middle equalizer plate and the bottom plate is at least 4 inches from the middle equalizer plate and wherein the spacing between the flange plate and the equalizer plates are equidistant from one another.

20. The reactor vessel system set forth in claim 1 wherein each of the equalizer plates include holes there through to allow vapor to flow through each of the equalizer plates rather than around the outer diameter or through the inner diameter but through holes in the plates and thereby reduce the effective dimension of the obstruction created by each of the equalizer plates and provide an additional design approach to obtain a desired pressure drop at each equalizer plate.

* * * * *